(12) United States Patent
Petaja et al.

(10) Patent No.: US 8,982,468 B2
(45) Date of Patent: Mar. 17, 2015

(54) VOIDED DIFFUSER

(75) Inventors: Jason S. Petaja, Cottage Grove, MN (US); William F. Edmonds, Minneapolis, MN (US); Adam D. Haag, Woodbury, MN (US); Eric W. Nelson, Stillwater, MN (US); Encai Hao, Woodbury, MN (US); William Blake Kolb, West Lakeland, MN (US); Fei Lu, Woodbury, MN (US); Richard J. Pokorny, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 259 days.

(21) Appl. No.: 13/501,310

(22) PCT Filed: Oct. 22, 2010

(86) PCT No.: PCT/US2010/053673
§ 371 (c)(1),
(2), (4) Date: Apr. 11, 2012

(87) PCT Pub. No.: WO2011/050236
PCT Pub. Date: Apr. 28, 2011

(65) Prior Publication Data
US 2012/0200919 A1 Aug. 9, 2012

Related U.S. Application Data

(60) Provisional application No. 61/254,676, filed on Oct. 24, 2009.

(51) Int. Cl.
*G02B 5/02* (2006.01)

(52) U.S. Cl.
CPC .................................. *G02B 5/0247* (2013.01)
USPC ............ 359/599; 359/601; 359/613; 359/614

(58) Field of Classification Search
CPC ............ G02B 1/11; G02B 1/118; G02B 5/02; G02B 5/0236; G02B 5/0242; G02B 5/0247
USPC ................................. 359/599, 601, 613, 614
See application file for complete search history.

(56) References Cited

U.S. PATENT DOCUMENTS

| | | | |
|---|---|---|---|
| 5,919,555 | A | 7/1999 | Yasuda |
| 6,719,426 | B2 | 4/2004 | Magarill |
| 6,924,014 | B2 | 8/2005 | Ouderkirk |
| 7,046,439 | B2 * | 5/2006 | Kaminsky et al. ............ 359/452 |
| 7,526,164 | B2 | 4/2009 | Ouderkirk |
| 7,599,592 | B2 | 10/2009 | Benson |
| 2003/0118807 | A1 | 6/2003 | Laney |

(Continued)

FOREIGN PATENT DOCUMENTS

| | | |
|---|---|---|
| JP | 11-006905 | 1/1999 |
| JP | 2002-196113 | 7/2002 |

(Continued)

*Primary Examiner* — Frank Font
(74) *Attorney, Agent, or Firm* — Gregg H. Rosenblatt

(57) ABSTRACT

A voided diffuser and an optical construction incorporating the voided diffuser are provided. The voided diffuser includes a plurality of beads and a binder composition in contact with the plurality of beads. The binder composition includes a binder and a plurality of interconnected voids. The optical construction includes the voided diffuser disposed on a substrate.

21 Claims, 4 Drawing Sheets

(56) References Cited

U.S. PATENT DOCUMENTS

| | | | |
|---|---|---|---|
| 2003/0214719 A1* | 11/2003 | Bourdelais et al. | 359/599 |
| 2004/0066556 A1 | 4/2004 | Dontula | |
| 2007/0026167 A1* | 2/2007 | Bourdelais et al. | 428/1.3 |
| 2008/0060311 A1 | 3/2008 | Moriau | |
| 2008/0064133 A1 | 3/2008 | Lee | |
| 2009/0009873 A1* | 1/2009 | Laney et al. | 359/599 |
| 2009/0279313 A1 | 11/2009 | Teragawa | |
| 2010/0208349 A1 | 8/2010 | Beer | |
| 2011/0149554 A1 | 6/2011 | Ouderkirk | |
| 2012/0287677 A1 | 11/2012 | Wheatley | |

FOREIGN PATENT DOCUMENTS

| | | |
|---|---|---|
| JP | 2004-235103 | 8/2004 |
| JP | 2004-348000 | 12/2004 |
| KR | 10-2002-0003667 | 1/2002 |
| TW | 200426464 | 12/2004 |
| WO | WO 2008-144136 | 11/2008 |
| WO | WO 2008-144636 | 11/2008 |
| WO | WO 2008-144644 | 11/2008 |
| WO | WO 2010-059566 | 5/2010 |
| WO | WO 2010-059568 | 5/2010 |
| WO | WO 2010-059579 | 5/2010 |
| WO | WO 2010-059614 | 5/2010 |
| WO | WO 2010-120422 | 10/2010 |
| WO | WO 2010-120468 | 10/2010 |
| WO | WO 2010-120845 | 10/2010 |
| WO | WO 2010-120864 | 10/2010 |
| WO | WO 2010-120871 | 10/2010 |
| WO | WO 2010-120971 | 10/2010 |
| WO | WO 2010-121019 | 10/2010 |
| WO | WO 2011-049751 | 4/2011 |
| WO | WO 2011-050228 | 4/2011 |
| WO | WO 2011-050232 | 4/2011 |
| WO | WO 2011-050254 | 4/2011 |
| WO | WO 2011-050268 | 4/2011 |

* cited by examiner

VOIDED DIFFUSER

CROSS REFERENCE TO RELATED APPLICATIONS

This application is a national stage filing under 35 U.S.C. 371 of PCT/US2010/053673, filed Oct. 22, 2010, which claims priority to U.S. Application No. 61/254,676, filed Oct. 24, 2009, the disclosure of which is incorporated by reference in their entirety herein.

RELATED APPLICATIONS

This application is related to the following U.S. Patent Publication Nos. which are incorporated by reference: "Optical Construction and Display System Incorporating Same" (U.S. Application No. 61/169,521); "Retroreflecting Optical Construction" (U.S. Application No. 61/169,532); "Optical Film for Preventing Optical Coupling" (U.S. Application No. 61/169,549); "Backlight and Display System Incorporating Same" (U.S. Application No. 61/169,555); "Process and Apparatus for Coating with Reduced Defects" (U.S. Application No. 61/169,427); and "Process and Apparatus for a Nanovoided Article" (U.S. Application No. 61/169,429).

This application is also related to the following U.S. Patent Publication Nos., which are incorporated by reference: "Gradient Low Index Article and Method" (U.S. Application No. 61/254,673); "Process for Gradient Nanovoided Article" (U.S. Application No. 61/254,674); and also 2012-0195050, entitled "Optical Constructions and Method of Making the Same".

FIELD OF THE INVENTION

This invention generally relates to optical films that include a diffuser coating and exhibit some low-refractive index-like properties. The invention is further applicable to optical systems, such as display systems incorporating such optical films.

BACKGROUND

Optical systems, such as retroreflecting or display systems, utilize one or more optical layers for managing incident light. Often, the optical layers are required to have a desired optical transmittance, optical haze, optical clarity, and index of refraction. In many applications, an air layer and a diffuser layer are incorporated into the optical system. Typically, the air layer supports total internal reflection and the diffuser layer provides optical diffusion.

SUMMARY OF THE INVENTION

In one aspect, the present disclosure provides a voided diffuser that includes a plurality of beads and a binder composition. The binder composition is in contact with the plurality of beads. Further, the binder composition includes a binder and a plurality of interconnected voids, wherein a volume fraction of the plurality of interconnected voids in the binder composition is not less than about 5%.

In another aspect, the present disclosure provides an optical construction that includes a substrate and a voided diffuser disposed on the substrate. The voided diffuser includes a plurality of beads and a binder composition. The binder composition is in contact with the plurality of beads. Further, the binder composition includes a binder and a plurality of interconnected voids, wherein a volume fraction of the plurality of interconnected voids in the binder composition is not less than about 5%.

In yet another aspect, the present disclosure provides an optical construction that includes a substrate and a voided diffuser disposed on the substrate. The voided diffuser further includes a binder, a plurality of interconnected voids dispersed within the binder, and a plurality of beads, wherein a weight ratio of the binder to the plurality of the beads is not less than about 1:1.

In yet another aspect, the present disclosure provides an optical construction that includes a reflective polarizer and a voided diffuser disposed on the reflective polarizer. The voided diffuser includes a plurality of voids and a plurality of beads, and an optical clarity that is not greater than about 10%, wherein a thickness of the voided diffuser is not greater than about 5 microns.

In yet another aspect, the present disclosure provides an optical stack that includes an absorbing polarizer, a voided diffuser comprising a plurality of voids and a plurality of beads, and a reflective polarizer, wherein substantial portions of each two neighboring major surfaces in the optical stack are in physical contact with each other.

In yet another aspect, the present disclosure provides a display system including an optical stack disposed on a lightguide. The optical stack further includes an absorbing polarizer, a voided diffuser including a plurality of voids and a plurality of beads, and a reflective polarizer, wherein substantial portions of each two neighboring major surfaces in the optical stack are in physical contact with each other.

The above summary is not intended to describe each disclosed embodiment or every implementation of the present disclosure. The figures and the detailed description below more particularly exemplify illustrative embodiments.

BRIEF DESCRIPTION OF DRAWINGS

The invention may be more completely understood and appreciated in consideration of the following detailed description of various embodiments of the invention in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
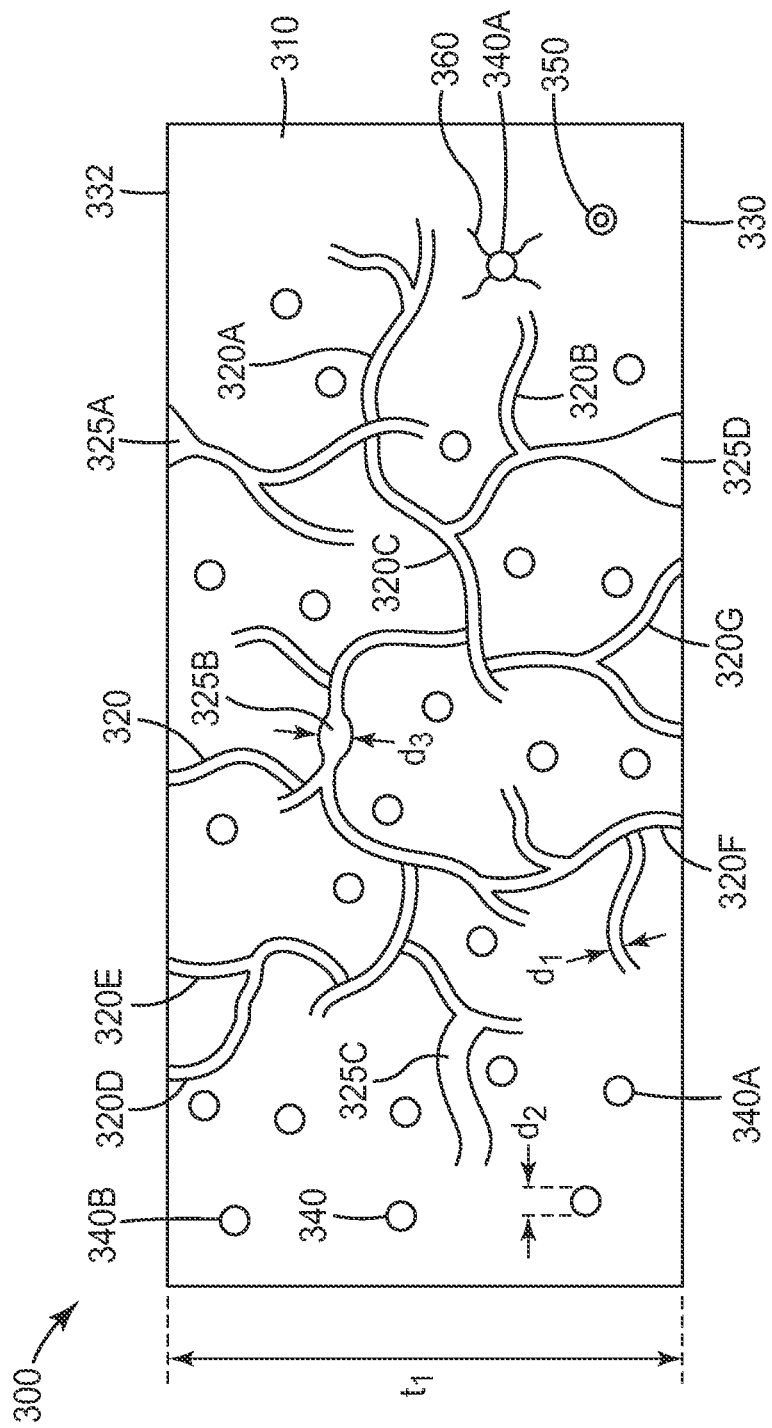
FIG. 1A is a schematic cross-sectional view of a binder composition.

The disclosure generally relates to a voided diffuser coating that includes beads, an organic binder, and voids dispersed throughout the organic binder. The voids dispersed throughout the organic binder create an optical coating that can offer low refractive index (that is, "air-like") properties. The voided diffuser coating can be combined with brightness enhancement films such as, but not limited to, multilayer optical film (MOF) reflective polarizers for liquid crystal displays. In one particular embodiment, for example, a MOF coated with the voided diffuser coating can be laminated to the liquid crystal display panel, and provides a unique backlight construction having high brightness and good lamp hiding performance. In comparison to most diffuser coatings, the voided diffuser coating exhibits significant gain increases, both in backlit and edgelit displays Often, a diffuser layer can include a plurality of organic or inorganic beads to enhance the diffusion properties. Such a beaded diffuser coating can be used in a liquid crystal display (LCD) to hide the light bulbs used in the backlights. The beaded diffusers can improve the uniformity of the light from the LCD. However, when a typical beaded diffuser is applied to the backside of optical films such as light-recycling films, it can reduce the gain of the optical film. In some cases, the gain of the beaded diffuser may be decreased by light interaction with the binder used to anchor the beads to the film. An "air-like" binder can be effective to increase the gain of the beaded diffuser applied to an optical film.

In one particular embodiment, a voided diffuser that has low index properties can be coated on the bottom or top of light management films including brightness enhancement film (BEF), multilayer optical films (MOF), absorbing polarizer films, or other optical films to produce a film that either maintains or increases the gain (that is, brightness) while improving the uniformity of the light, with better durability and potentially higher contrast ratio. As used herein, "gain" or "optical gain" of an optical construction is defined as the ratio of the axial output luminance of an optical or display system with the optical construction to the axial output luminance of the same optical or display system without the optical construction. The voided diffusers can be used in place of high haze/low index materials, such as, for example, those described in co-pending U.S. patent application entitled OPTICAL FILM (U.S. Application No. 61/169,466), filed on Apr. 15, 2009.

The binder compositions generally exhibit some low-index-like optical properties. Some disclosed binder compositions have a low optical haze and a low effective index of refraction, such as an optical haze of less than about 5% and an effective index of refraction that is less than about 1.35. Some disclosed binder compositions have a high optical haze and/or high diffuse optical reflectance while manifesting some low-index-like optical properties, such as, for example, the ability to support total internal reflection or enhance internal reflection. Generally, the voided diffusers incorporating the binder compositions have a high optical haze and a low optical clarity, resulting in efficient bulb-hiding in a LCD display.

In some cases, the disclosed voided diffusers can be incorporated in various optical or display systems such as, for example, a general lighting system, a liquid crystal display system, or a retro-reflecting optical system to improve system durability, reduce manufacturing cost, and reduce the overall thickness of the system while improving, maintaining or substantially maintaining at least some of the system optical properties such as, for example, the retro-reflectivity of the system or the on-axis brightness and contrast of an image displayed by the system.

The voided diffusers disclosed herein, typically include a binder compositions that includes a plurality of interconnected voids or a network of voids dispersed in a binder that interconnects (that is, bonds together) a plurality of beads. As used herein, "beads" are defined as having an average effective diameter of generally greater than about 1 micrometer (1 micron) in size, while "particles" or "nanoparticles" are defined as having an average effective diameter of generally less than about 1 micron in size. In some cases, however, individual particles or nanoparticles may form agglomerates that can have an average effective diameter ranging up to about 5 microns in size. An effective diameter generally means the diameter of a sphere having the same volume as the particle or bead.

At least some of the voids in the plurality or network are connected to one another via hollow tunnels or hollow tunnel-like passages. The voids are not necessarily free of all matter and/or particulates. For example, in some cases, a void may include one or more small fiber- or string-like objects that include, for example, a binder and/or particles or nano-particles. In some cases, a void may include particles or particle agglomerates that may be attached to the binder, or may be loose within the void. Some disclosed voided diffusers include multiple pluralities of interconnected voids or multiple networks of voids where the voids in each plurality or network are interconnected. In some cases, in addition to multiple pluralities of interconnected voids, the disclosed voided diffusers include a plurality of closed or unconnected voids meaning that the voids are not connected to other voids via tunnels.

Some disclosed voided diffusers support total internal reflection (TIR) or enhanced internal reflection (EIR) by virtue of including a plurality of voids. When light that travels in an optically clear non-porous medium is incident on a stratum possessing high porosity, the reflectivity of the incident light is much higher at oblique angles than at normal incidence. In the case of no or low haze voided films, the reflectivity at oblique angles greater than the critical angle is close to about 100%. In such cases, the incident light undergoes total internal reflection (TIR). In the case of high haze voided films, the oblique angle reflectivity can be close to 100% over a similar range of incident angles even though the light may not undergo TIR. This enhanced reflectivity for high haze films is similar to TIR and is designated as Enhanced Internal Reflectivity (EIR). As used herein, by a porous or voided diffuser enhancing internal reflection (EIR), it is meant that the reflectance at the boundary of the voided and non-voided strata of the film or film laminate is greater with the voids than without the voids.

The voids in the disclosed voided diffusers have an index of refraction $n_v$ and a permittivity $\epsilon_v$, where $n_v^2 = \epsilon_v$, and the binder has an index of refraction $n_b$ and a permittivity $\epsilon_b$, where $n_b^2 = \epsilon_b$. In general, the interaction of an voided diffuser with light, such as light that is incident on, or propagates in, the optical film, depends on a number of film characteristics such as, for example, the film thickness, the binder index, the bead index and separation, the void or pore index, the pore shape and size, the spatial distribution of the pores, and the wavelength of light. In some cases, light that is incident on or propagates within the voided diffuser, "sees" or "experiences" an effective permittivity $\epsilon_{\mathit{eff}}$ and an effective index $n_{\mathit{eff}}$, where $n_{\mathit{eff}}$ can be expressed in terms of the void index $n_v$, the binder index $n_b$, and the void porosity or volume fraction "f". In such cases, the voided diffuser is sufficiently thick and the voids are sufficiently small so that light cannot resolve the shape and features of a single or isolated void. In such cases, the size of at least a majority of the voids, such as at least 60% or 70% or 80% or 90% of the voids, is not greater than about $\lambda/5$, or not greater than about $\lambda/6$, or not greater than about $\lambda/8$, or not greater than about $\lambda/10$, or not greater than about $\lambda/20$, where $\lambda$ is the wavelength of light.

In some cases, light that is incident on a disclosed voided diffuser is a visible light meaning that the wavelength of the light is in the visible range of the electromagnetic spectrum.

In such cases, the visible light has a wavelength that is in a range from about 380 nm to about 750 nm, or from about 400 nm to about 700 nm, or from about 420 nm to about 680 nm. In such cases, the voided diffuser has an effective index of refraction and includes a plurality of voids if the size of at least a majority of the voids, such as at least 60% or 70% or 80% or 90% of the voids, is not greater than about 70 nm, or not greater than about 60 nm, or not greater than about 50 nm, or not greater than about 40 nm, or not greater than about 30 nm, or not greater than about 20 nm, or not greater than about 10 nm.

FIG. 1A is a schematic cross-sectional view of a binder composition 300 that includes a network of voids or plurality of interconnected voids 320 and optionally a plurality of particles 340 dispersed substantially uniformly within a binder 310. Binder composition 300 has a porous interior by virtue of the presence of network of voids 320 within the binder composition. In general, the binder composition can include one or more networks of interconnected pores or voids. For example, network of voids 320 can be regarded to include interconnected voids or pores 320A-320C. In some cases, the binder composition is a porous film meaning that the network of voids 320 forms one or more passages between first and second major surfaces 330 and 332, respectively.

The network of voids can be regarded to include a plurality of interconnected voids. Some of the voids can be at a surface of the binder composition and can be regarded to be surface voids. For example, in the exemplary binder composition 300, voids 320D and 320E are at a second major surface 332 of the binder composition and can be regarded as surface voids 320D and 320E, and voids 320F and 320G are at a first major surface 330 of the binder composition and can be regarded as surface voids 320F and 320G. Some of the voids, such as for example voids 320B and 320C, are within the interior of the binder composition and away from the exterior surfaces of the binder composition and can be regarded as interior voids 320B and 320C, even though an interior void can be connected to a major surface via, for example, other voids.

Voids 320 have a size $d_1$ that can generally be controlled by choosing suitable composition and fabrication, such as coating, drying and curing conditions. In general, $d_1$ can be any desired value in any desired range of values. For example, in some cases, at least a majority of the voids, such as at least 60% or 70% or 80% or 90% or 95% of the voids, have a size that is in a desired range. For example, in some cases, at least a majority of the voids, such as at least 60% or 70% or 80% or 90% or 95% of the voids, have a size that is not greater than about 10 microns, or not greater than about 7 microns, or not greater than about 5 microns, or not greater than about 4 microns, or not greater than about 3 microns, or not greater than about 2 microns, or not greater than about 1 micron, or not greater than about 0.7 microns, or not greater than about 0.5 microns.

In some cases, plurality of interconnected voids 320 has an average void or pore size that is not greater than about 5 microns, or not greater than about 4 microns, or not greater than about 3 microns, or not greater than about 2 microns, or not greater than about 1 micron, or not greater than about 0.7 microns, or not greater than about 0.5 microns.

In some cases, some of the voids can be sufficiently small so that their primary optical effect is to reduce the effective index, while some other voids can reduce the effective index and scatter light, while still some other voids can be sufficiently large so that their primary optical effect is to scatter light.

Optional particles 340 have a size $d_2$ that can be any desired value in any desired range of values. For example, in some cases at least a majority of the particles, such as at least 60% or 70% or 80% or 90% or 95% of the particles, have a size that is in a desired range. For example, in some cases, at least a majority of the particles, such as at least 60% or 70% or 80% or 90% or 95% of the particles, have a size that is not greater than about 1 micron, or not greater than about 700 nm, or not greater than about 500 nm, or not greater than about 200 nm, or not greater than about 100 nm, or not greater than about 50 nm.

In some cases, optional plurality of particles 340 has an average particle size that is not greater than about 1 micron, or not greater than about 700 nm, or not greater than about 500 nm, or not greater than about 200 nm, or not greater than about 100 nm, or not greater than about 50 nm.

In some cases, some of the optional particles can be sufficiently small so that they primary affect the effective index, while some other particles can affect the effective index and scatter light, while still some other particles can be sufficiently large so that their primary optical effect is to scatter light.

In some cases, $d_1$ and/or $d_2$ are sufficiently small so that the primary optical effect of the voids and the optional particles is to affect the effective index of binder composition 300. For example, in such cases, $d_1$ and/or $d_2$ are not greater than about $\lambda/5$, or not greater than about $\lambda/6$, or not greater than about $\lambda/8$, or not greater than about $\lambda/10$, or not greater than about $\lambda/20$, where $\lambda$ is the wavelength of light. As another example, in such cases, $d_1$ and $d_2$ are not greater than about 70 nm, or not greater than about 60 nm, or not greater than about 50 nm, or not greater than about 40 nm, or not greater than about 30 nm, or not greater than about 20 nm, or not greater than about 10 nm. In such cases, the voids and the optional particles may also scatter light, but the primary optical effect of the voids and the optional particles is to define an effective medium in the binder composition that has an effective index. The effective index depends, in part, on the indices of refraction of the voids, the binder, and the optional particles. In some cases, the effective index is a reduced effective index, meaning that the effective index is less than the index of the binder and the index of the optional particles.

In cases where the primary optical effect of the voids and/or the optional particles is to affect the index, $d_1$ and $d_2$ are sufficiently small so that a substantial fraction, such as at least about 60%, or at least about 70%, or at least about 80%, or at least about 90%, or at least about 95% of voids 320 and optional particles 340 have the primary optical effect of reducing the effective index. In such cases, a substantial fraction, such as at least about 60%, or at least about 70%, or at least about 80%, or at least about 90%, or at least about 95% the voids and/or the optional particles, have a size that is in a range from about 1 nm to about 200 nm, or from about 1 nm to about 150 nm, or from about 1 nm to about 100 nm, or from about 1 nm to about 50 nm, or from about 1 nm to about 20 nm.

In some cases, the index of refraction $n_1$ of optional particles 340 can be sufficiently close to the index $n_b$ of binder 310, so that the effective index does not depend, or depends very little, on the index of refraction of the particles. In such cases, the difference between $n_1$ and $n_b$ is not greater than about 0.05, or not greater than about 0.01, or not greater than about 0.007, or not greater than about 0.005, or not greater than about 0.003, or not greater than about 0.002, or not greater than about 0.001. In some cases, optional particles 340 are sufficiently small and their index is sufficiently close to the index of the binder, that the optional particles do not primarily scatter light or affect the index. In such cases, the primary effect of the optional particles can, for example, be to enhance the strength of binder composition 300. In some cases, optional particles 340 can enhance the process of making the binder composition although, in general, binder composition 300 can be made with no particles.

In cases where the primary optical effect of network of voids 320 and optional particles 340 is to affect the effective index and not to, for example, scatter light, the optical haze of binder composition 300 that is due to voids 320 and optional particles 340 is not greater than about 5%, or not greater than about 4%, or not greater than about 3.5%, or not greater than about 4%, or not greater than about 3%, or not greater than about 2.5%, or not greater than about 2%, or not greater than about 1.5%, or not greater than about 1%. In such cases, the effective index of the effective medium of the binder composition is not greater than about 1.35, or not greater than about 1.3, or not greater than about 1.25, or not greater than about 1.2, or not greater than about 1.15, or not greater than about 1.1, or not greater than about 1.05.

In some cases, $d_1$ and/or $d_2$ are sufficiently large so that their primary optical effect is to scatter light and produce optical haze. In such cases, $d_1$ and/or $d_2$ are not less than about 200 nm, or not less than about 300 nm, or not less than about 400 nm, or not less than about 500 nm, or not less than about 600 nm, or not less than about 700 nm, or not less than about 800 nm, or not less than about 900 nm, or not less than about 1000 nm. In such cases, the voids and the optional particles may also affect the index, but their primarily optical effect is to scatter light. In such cases, light incident on the binder composition can be scattered by both the voids and the optional particles.

In some cases, binder composition 300 has a low optical haze. In such cases, the optical haze of the binder composition is not greater than about 5%, or not greater than about 4%, or not greater than about 3.5%, or not greater than about 4%, or not greater than about 3%, or not greater than about 2.5%, or not greater than about 2%, or not greater than about 1.5%, or not greater than about 1%. In such cases, the binder composition can have a reduced effective index that is not greater than about 1.35, or not greater than about 1.3, or not greater than about 1.2, or not greater than about 1.15, or not greater than about 1.1, or not greater than about 1.05. For light normally incident on binder composition 300, optical haze, as used herein, is defined as the ratio of the transmitted light that deviates from the normal direction by more than 4 degrees to the total transmitted light. Haze values disclosed herein were measured using a Haze-Gard Plus haze meter (BYK-Gardner, Silver Springs, Md.) according to the procedure described in ASTM D1003.

In some cases, binder composition 300 has a high optical haze. In such cases, the haze of the binder composition is not less than about 40%, or not less than about 50%, or not less than about 60%, or not less than about 70%, or not less than about 80%, or not less than about 90%, or not less than about 95%. In some cases, binder composition 300 can have an intermediate optical haze, for example, between about 5% and about 40% optical haze.

In some cases, binder composition 300 has a high diffuse optical reflectance. In such cases, the diffuse optical reflectance of the binder composition is not less than about 30%, or not less than about 40%, or not less than about 50%, or not less than about 60%.

In some cases, binder composition 300 has a high optical clarity. For light normally incident on binder composition 300, optical clarity, as used herein, refers to the ratio $(T_2-T_1)/(T_1+T_2)$, where $T_1$ is the transmitted light that deviates from the normal direction between 1.6 and 2 degrees, and $T_2$ is the transmitted light that lies between zero and 0.7 degrees from the normal direction. Clarity values disclosed herein were measured using a Haze-Gard Plus haze meter from BYK-Gardner. In the cases where binder composition 300 has a high optical clarity, the clarity is not less than about 40%, or not less than about 50%, or not less than about 60%, or not less than about 70%, or not less than about 80%, or not less than about 90%, or not less than about 95%.

In some cases, binder composition 300 has a low optical clarity. In such cases, the optical clarity of the binder composition is not greater than about 40%, or not greater than about 20%, or not greater than about 10%, or not greater than about 7%, or not greater than about 5%, or not greater than about 4%, or not greater than about 3%, or not greater than about 2%, or not greater than about 1%.

In general, binder composition can have any porosity or void volume fraction that may be desirable in an application. In some cases, the volume fraction of plurality of voids 320 in binder composition 300 is not less than about 5%, or not less than about 10%, or not less than about 20%, or not less than about 30%, or not less than about 40%, or not less than about 50%, or not less than about 60%, or not less than about 70%, or not less than about 80%, or not less than about 90%.

In some cases, binder composition can manifest some low-index properties, even if the binder composition has a high optical haze and/or diffuse reflectance. For example, in such cases, the binder composition can support TIR at angles that correspond to an index that is smaller than the index $n_b$ of binder 310.

In the exemplary binder composition 300, optional particles 340, such as particles 340A and 340B, are solid particles. In some cases, binder composition 300 may additionally or alternatively include a plurality of hollow or porous particles 350.

Optional particles 340 can be any type particles that may be desirable in an application. For example, optional particles 340 can be organic or inorganic particles, or a combination of organic and inorganic particles. The particles can be solid particles, or they can be hollow particles, such as bubbles. In one particular embodiment, organic particles can be made from polymers such as, for example, polymethylmethacrylate (PMMA), polystyrene (PS), polysilsesquioxane, silicone, and the like. In one particular embodiment, inorganic particles can be made from, for example, glasses or ceramics, and the like. For example, particles 340 can be silica, zirconium oxide or alumina particles.

Optional particles 340 can have any shape that may be desirable or available in an application. For example, optional particles 340 can have a regular or irregular shape. For example, optional particles 340 can be approximately spherical. As another example, the optional particles can be elongated. In such cases, binder composition 300 includes a plurality of elongated particles 340. In some cases, the elongated particles have an average aspect ratio that is not less than about 1.5, or not less than about 2, or not less than about 2.5, or not less than about 3, or not less than about 3.5, or not less than about 4, or not less than about 4.5, or not less than about 5. In some cases, the particles can be in the form or shape of a string-of-pearls (such as Snowtex-PS particles available from Nissan Chemical, Houston, Tex.) or aggregated chains of spherical or amorphous particles, such as fumed silica.

Optional particles 340 may or may not be functionalized. In some cases, optional particles 340 are not functionalized. In some cases, optional particles 340 are functionalized so that they can be dispersed in a desired solvent or binder 310 with no, or very little, clumping. In some cases, optional particles 340 can be further functionalized to chemically bond to binder 310. For example, optional particles 340, such as particle 340A, can be surface modified and have reactive functionalities or groups 360 to chemically bond to binder 310. In such cases, at least a significant fraction of optional particles 340 is chemically bound to the binder. In some cases, optional particles 340 do not have reactive functionalities to chemically bond to binder 310. In such cases, optional particles 340 can be physically bound to binder 310.

In some cases, some of the optional particles have reactive groups and others do not have reactive groups. For example in some cases, about 10% of the optional particles have reactive groups and about 90% of the optional particles do not have reactive groups, or about 15% of the optional particles have reactive groups and about 85% of the optional particles do not have reactive groups, or about 20% of the optional particles have reactive groups and about 80% of the optional particles do not have reactive groups, or about 25% of the optional particles have reactive groups and about 75% of the optional particles do not have reactive groups, or about 30% of the optional particles have reactive groups and about 60% of the optional particles do not have reactive groups, or about 35% of the optional particles have reactive groups and about 65% of the optional particles do not have reactive groups, or about 40% of the optional particles have reactive groups and about 60% of the optional particles do not have reactive groups, or about 45% of the optional particles have reactive groups and about 55% of the optional particles do not have reactive groups, or about 50% of the optional particles have reactive groups and about 50% of the optional particles do not have reactive groups. In some cases, some of the optional particles may be functionalized with both reactive and unreactive groups on the same particle.

The ensemble of optional particles may include a mixture of sizes, reactive and non-reactive particles and different types of particles (for example, silica and zirconium oxide).

Binder 310 can be or include any material that may be desirable in an application. For example, binder 310 can be a UV curable material that forms a polymer, such as a cross-linked polymer. In general, binder 310 can be any polymerizable material, such as a polymerizable material that is radiation-curable, or a polymerizable material that is thermally-curable. In one particular embodiment, binder 310 can be a mixture of any polymerizable material with a compatible non-polymerizable polymer, such as described in, for example, co-pending application titled "PROCESS AND APPARATUS FOR A NANOVOIDED ARTICLE" (U.S. Application No. 61/169,429), filed on Apr. 15, 2009, the disclosures of which are incorporated in their entirety herein by reference.

Binder composition 300 can be produced using any method that may be desirable in an application. In some cases, binder composition 300 can be produced by the processes described in co-pending application titled "PROCESS AND APPARATUS FOR A NANOVOIDED ARTICLE" (U.S. Application No. 61/169,521), and co-pending application titled "PROCESS AND APPARATUS FOR COATING WITH REDUCED DEFECTS", (U.S. Application No. 61/169,427), both filed on Apr. 15, 2009, and also co-pending U.S. Patent Applications entitled "Gradient Low Index Article and Method" (U.S. Application No. 61/254,673); and "Process for Gradient Nanovoided Article" (U.S. Application No. 61/254,674), both filed on an even date herewith, the disclosures of which are incorporated in their entirety herein by reference. In one process, first a solution is prepared that includes a plurality of optional particles, such as nano-particles, and a polymerizable material dissolved in a solvent, where the polymerizable material can include, for example, one or more types of monomers and/or oligomers. Next, the polymerizable material is polymerized, for example by applying heat or light, to form an insoluble polymer matrix in the solvent. In some cases, after the polymerization step, the solvent may still include some of the polymerizable material, although at a lower concentration. Next, the solvent is removed by drying or evaporating the solution resulting in binder composition 300 that includes a network, or a plurality, of voids 320 dispersed in polymer binder 310. The binder composition further includes plurality of optional particles 340 dispersed in the polymer. The optional particles are bound to the binder, where the bonding can be physical or chemical, or may be encapsulated by the binder.

Binder composition 300 can have other materials in addition to binder 310 and optional particles 340. For example, binder composition 300 can include one or more additives, such as for example, coupling agents, to help wet the surface of a substrate, not expressly shown in FIG. 1A, on which the binder composition is formed. As another example, binder composition 300 can include one or more colorants, such a carbon black, for imparting a color, such as the black color, to the binder composition. Other exemplary materials in binder composition 300 include initiators, such as one or more photo-initiators, anti-stats, UV absorbers and release agents. In some cases, binder composition 300 can include a down converting material that is capable of absorbing light and reemitting a longer wavelength light. Exemplary down converting materials include phosphors.

In general, binder composition 300 can have a desirable porosity for any weight ratio of binder 310 to plurality of optional particles 340. Accordingly, in general, the weight ratio can be any value that may be desirable in an application. In some cases, the weight ratio of binder 310 to plurality of optional particles 340 is not less than about 1:2.5, or not less than about 1:2.3, or not less than about 1:2, or not less than about 1:1, or not less than about 1.5:1, or not less than about 2:1, or not less than about 2.5:1, or not less than about 3:1, or not less than about 3.5:1, or not less than about 4:1, or not less than about 5:1. In some cases, the weight ratio is in a range from about 1:2.3 to about 4:1.

In some cases, top major surface 332 of binder composition 300 can be treated to, for example, improve the adhesion of the binder composition to another layer. For example, the top surface can be corona treated.

Figure 1B:
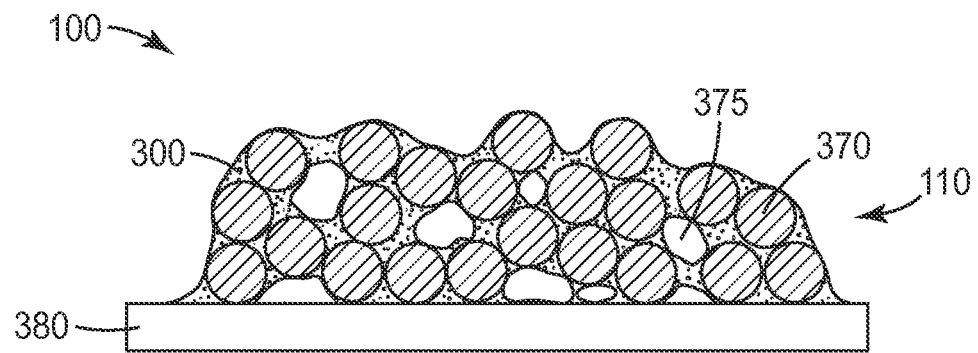
FIG. 1B is a schematic cross-sectional view of a voided diffuser.

FIG. 1B is a schematic side-view of a voided diffuser 100 according to one aspect of the disclosure. In FIG. 1B, voided diffuser 100 includes a voided diffuser coating 110 disposed on a substrate 380. Voided diffuser coating 110 includes a binder composition 300 contacting a plurality of beads 370. The binder composition 300 has been described previously, with reference to FIG. 1A. In some cases, voided diffuser 100 can further include a plurality of gaps 375 within voided diffuser coating 110, which may be formed, for example, due to the stacking of the plurality of beads 370, and/or collapse of the binder composition 300. In some cases, the plurality of gaps 375 may be formed in voided diffuser 100 by adjustment of the binder composition 300 to plurality of bead 370 ratio, such that the ratio is "lean", that is, a minimal amount of binder composition 300 is used such as, for example, a binder composition 300 to plurality of bead 370 ratio of less than about 1:1, less than about 2:3, less than about 1:2, or less than about 1:3.

The voided diffuser 100 can be prepared by including beads 370 into coating solutions described in, for example, co-pending U.S. Patent Applications entitled "Process and Apparatus for Coating with Reduced Defects" (U.S. Application No. 61/169,427); and "Process and Apparatus for a Nanovoided Article" (U.S. Application No. 61/169,429), both filed on Apr. 15, 2009, and also co-pending U.S. Patent Applications entitled "Gradient Low Index Article and Method" (U.S. Application No. 61/254,673); and "Process for Gradient Nanovoided Article" (U.S. Application No. 61/254,674), 65766US002), both filed on an even date herewith.

In one particular embodiment, beads 370 can be inorganic beads, organic beads, or a combination of inorganic beads and organic beads. The beads can be solid beads, porous beads, or they can be hollow beads such as bubbles. In one particular embodiment, organic beads can be made from polymers such as, for example, polymethylmethacrylate (PMMA), polystyrene (PS), polysilsesquioxane, silicone, and the like. In one particular embodiment, inorganic beads made from, for example, glasses or ceramics, and the like.

Beads 370 can have any shape that may be desirable or available in an application. For example, beads 370 can have spherical or non-spherical shape. For example, beads 370 can be spherical beads, such as available from, for example, Sekisui Plastics Co, Osaka, Japan, or Soken Chemical and Engineering Co., Tokyo, Japan. As another example, the beads 370 can be irregular shaped beads such as, for example, hemi-spherical biconvex lens shaped beads available from Sekisui Plastics Co, or blood-cell shaped beads available from Soken Chem. Co. In one particular embodiment, the beads 370 can include a reactive functionality capable of being chemically bound to the binder, similar to the reactive functionalities on the optional particles 340, described elsewhere.

Beads 370 have a size that can be any desired value in any desired range of values. For example, in some cases at least a majority of the beads, such as at least 60% or 70% or 80% or 90% or 95% of the beads, have a size that is in a desired range. For example, in some cases, at least a majority of the beads, such as at least 60% or 70% or 80% or 90% or 95% of the beads, have a size that is not less than about 1 micron, or not less than about 2 microns, or not less than about 3 microns, or not less than about 4 micron, or not less than about 5 microns, or not less than about 7 microns, or not less than about 10 microns.

In some cases, plurality of beads 370 has an average size that is not less than about 1 micron, or not less than about 2 microns, or not less than about 3 microns, or not less than about 4 micron, or not less than about 5 microns, or not less than about 7 microns, or not less than about 10 microns. In some cases, some of the beads can be sufficiently large so that their primary optical effect is to scatter light.

Figure 1C:
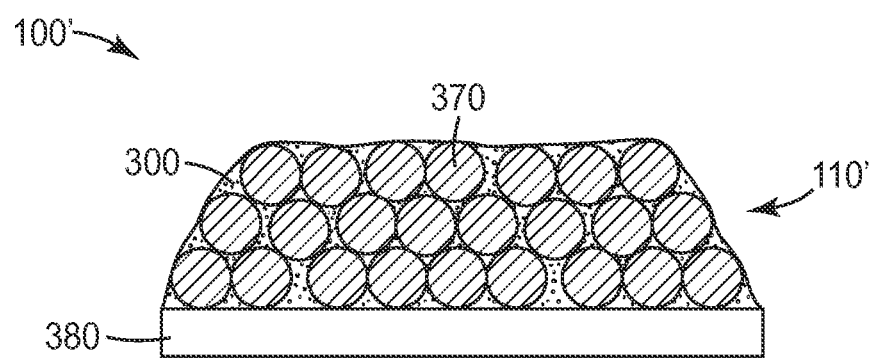
FIG. 1C is a schematic cross-sectional view of a voided diffuser.

FIG. 1C is a schematic side-view of a voided diffuser 100' according to one aspect of the disclosure. In FIG. 1C, voided diffuser 100' includes a voided diffuser coating 110' disposed on a substrate 380. Voided diffuser coating 110' includes a binder composition 300 contacting a plurality of beads 370. The binder composition 300 has been described previously, with reference to FIG. 1A. In some cases, voided diffuser 100' may exclude any significant gaps 375 shown in FIG. 1B, and the binder composition 300 may completely surround the plurality of beads 370, such as, for example, when the ratio of the plurality of beads 370 to the binder composition 300 is not less than about 1:3, not less than about 1:2, not less than about 3:2, or not less than about 1:1.

The voided diffuser 100 can be prepared by including beads 370 into coating solutions described in, for example, co-pending U.S. Patent Applications entitled "Process and Apparatus for Coating with Reduced Defects" (U.S. Application No. 61/169,427); and "Process and Apparatus for a Nanovoided Article" (U.S. Application No. 61/169,429), both filed on Apr. 15, 2009, and also co-pending U.S. Patent Applications entitled "Gradient Low Index Article and Method" (U.S. Application No. 61/254,673); and "Process for Gradient Nanovoided Article" (U.S. Application No. 61/254,674), both filed on an even date herewith.

Figure 2:
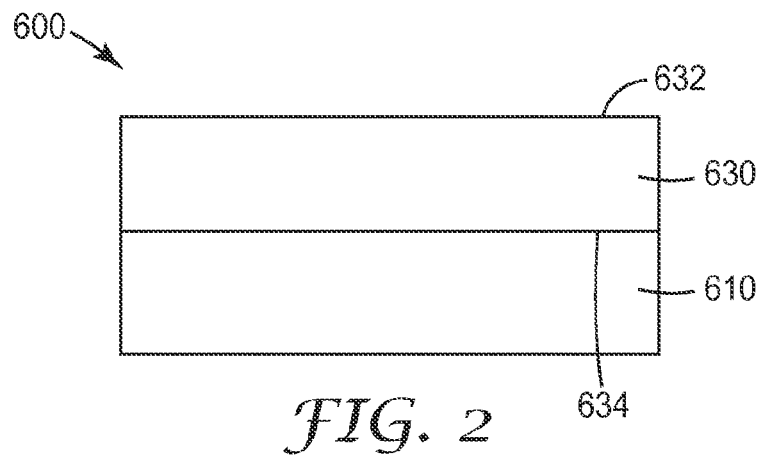
FIG. 2 is a schematic side-view of an optical construction.

FIG. 2 is a schematic side-view of an optical construction 600 that includes a voided diffuser 630 disposed on a substrate 610. In some cases, substrate 610 is a release liner that provides a transferable voided diffuser 630, meaning that, for example, the exposed top major surface 632 of the voided diffuser 630 may be placed in contact with a substrate or surface and the release liner may thereafter be stripped away from the voided diffuser to expose a bottom major surface 634 of the voided diffuser that can, for example, be bonded to another substrate or surface. The release force for releasing voided diffuser 630 from a release liner 610 is generally less than about 200 g-force/inch, or less than about 150 g-force/inch, or less than about 100 g-force/inch, or less than about 75 g-force/inch, or less than about 50 g-force/inch.

Voided diffuser 630 can be similar to any voided diffuser disclosed herein. For example, voided diffuser 630 can be similar to one of voided diffusers 100, 100'. In some cases, one of voided diffusers 100, 100' may be coated directly onto substrate 610. In some cases, one of voided diffusers 100, 100' may be first formed and thereafter transferred onto substrate 610. Substrate 610 can be translucent, transparent, or opaque.

Substrate 610 can be or include any material that may be suitable in an application, such as a dielectric, a semiconductor, or a conductor (such as a metal). For example, substrate 610 can include or be made of glass and polymers such as polyethylene terephthalate (PET), polycarbonates, and acrylics. In some cases, the substrate 610 can include a polarizer such as a reflective polarizer, an absorbing polarizer, a wire-grid polarizer, or a fiber polarizer. In some case, the substrate 610 can include multiple layers, such as a multilayer optical film including, for example, multilayer reflecting films and multilayer polarizing films. In some cases, the substrate 610 can include a structured surface, such as a major surface having a plurality of microstructures including, for example, an array of prisms or lenses. In some cases, the substrate 610 can include further coatings on a major surface such as, for example, a primer coating.

As used herein, a fiber polarizer includes a plurality of substantially parallel fibers that form one or more layers of fibers embedded within a binder with at least one of the binder and the fibers including a birefringent material. The substantially parallel fibers define a transmission axis and a reflection axis. The fiber polarizer substantially transmits incident light that is polarized parallel to the transmission axis and substantially reflects incident light that is polarized parallel to the reflection axis. Examples of fiber polarizers are described in, for example, U.S. Pat. Nos. 7,599,592 and 7,526,164, the entireties of which are incorporated herein by reference.

In some cases, the substrate 610 can include a partial reflector. A partial reflector is an optical element or a collection of optical elements which reflect at least 30% of incident light while transmitting the remainder, minus absorption losses. Suitable partial reflectors include, for example, foams, polarizing and non-polarizing multilayer optical films, microreplictated structures (for example BEF), polarized and non-polarized blends, wire grid polarizers, partially transmissive metals such as silver or nickel, metal/dielectric stacks such as silver and indium tin oxide, and asymmetric optical films. Asymmetric optical films are described, for example, in U.S. Pat. No. 6,924,014 (Ouderkirk et al.) and also in PCT Publication WO2008/144636. Also useful as partial reflectors are perforated partial reflectors or mirrors, such as, for example, perforating an enhanced specular reflector (ESR, available from 3M Company).

In one particular embodiment, substrate 610 can be a reflective polarizer. A reflective polarizer layer substantially reflects light that has a first polarization state and substantially transmits light that has a second polarization state, where the two polarization states are mutually orthogonal. For example, the average reflectance of a reflective polarizer in the visible for the polarization state that is substantially reflected by the reflective polarizer is at least about 50%, or at least about 60%, or at least about 70%, or at least about 80%, or at least about 90%, or at least about 95%. As another example, the average transmittance of a reflective polarizer in the visible for the polarization state that is substantially transmitted by the reflective polarizer is at least about 50%, or at least about 60%, or at least about 70%, or at least about 80%, or at least about 90%, or at least about 95%, or at least about 97%, or at least about 98%, or at least about 99%. In some cases, the reflective polarizer substantially reflects light having a first linear polarization state (for example, along the x-direction) and substantially transmits light having a second linear polarization state (for example, along the z-direction).

Any suitable type of reflective polarizer may be used such as, for example, a multilayer optical film (MOF) reflective polarizer such as Vikuiti™ Dual Brightness Enhancement Film (DBEF), a diffusely reflective polarizing film (DRPF) having a continuous phase and a disperse phase, such as a Vikuiti™ Diffuse Reflective Polarizer Film ("DRPF") available from 3M Company, St. Paul, Minn., a wire grid reflective polarizer described in, for example, U.S. Pat. No. 6,719,426, or a cholesteric reflective polarizer.

For example, in some cases, the reflective polarizer layer can be or include an MOF reflective polarizer, formed of alternating layers of different polymer materials, where one of the sets of alternating layers is formed of a birefringent material, where the refractive indices of the different materials are matched for light polarized in one linear polarization state and unmatched for light in the orthogonal linear polarization state. In such cases, an incident light in the matched polarization state is substantially transmitted through the reflective polarizer and an incident light in the unmatched polarization state is substantially reflected by reflective polarizer. In some cases, an MOF reflective polarizer can include a stack of inorganic dielectric layers.

As another example, the reflective polarizer can be or include a partially reflecting layer that has an intermediate on-axis average reflectance in the pass state. For example, the partially reflecting layer can have an on-axis average reflectance of at least about 90% for visible light polarized in a first plane, such as the xy-plane, and an on-axis average reflectance in a range from about 25% to about 90% for visible light polarized in a second plane, such as the xz-plane, perpendicular to the first plane. Such partially reflecting layers are described in, for example, U.S. Patent Publication No. 2008/064133, the disclosure of which is incorporated herein in its entirety by reference.

In some cases, the reflective polarizer can be or include a circular reflective polarizer, where light circularly polarized in one sense, which may be the clockwise or counterclockwise sense (also referred to as right or left circular polarization), is preferentially transmitted and light polarized in the opposite sense is preferentially reflected. One type of circular polarizer includes a cholesteric liquid crystal polarizer.

In some cases, the reflective polarizer can be a multilayer optical film that reflects or transmits light by optical interference, such as those described in Provisional U.S. Patent Application No. 61/116,132, filed Nov. 19, 2008; Provisional U.S. Patent Application No. 61/116,291, filed Nov. 19, 2008; Provisional U.S. Patent Application No. 61/116,294, filed Nov. 19, 2008; Provisional U.S. Patent Application No. 61/116,295, filed Nov. 19, 2008; Provisional U.S. Patent Application No. 61/116,295, filed Nov. 19, 2008; and International Patent Application No. PCT/US 2008/060311, filed May 19, 2008, claiming priority from Provisional U.S. Patent Application No. 60/939,085, filed May 20, 2007; all incorporated herein by reference in their entirety.

In one particular embodiment, substrate 610 can be a microstructured surface, such as a prismatic light directing film. For example, voided diffuser 630 can be coated on the prism side of a light redirecting film such as Vikuiti™ Brightness Enhancing Film (BEF), available from 3M Company. The BEF includes a plurality of linear prisms with, for example, a 24 micron pitch and a prism peak or apex angle of about 90 degrees.

Substantial portions of each two neighboring major surfaces in optical construction 600 are in physical contact with each other along the bottom major surface 634 of voided diffuser 630. For example, at least 50%, or at least 60%, or at least 70%, or at least 80%, or at least 90%, or at least 95% of the two neighboring major surfaces are in physical contact with each other. For example, in some cases, voided diffuser 630 is coated directly on substrate 610.

Figure 3:
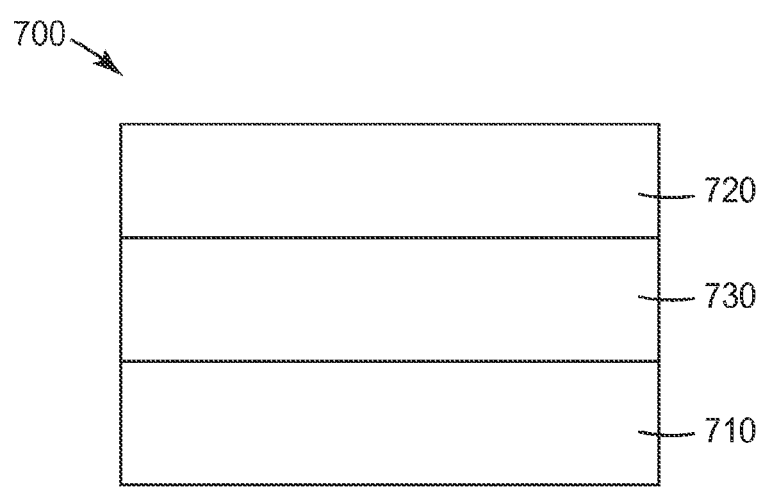
FIG. 3 is a schematic side-view of an optical construction.

FIG. 3 is a schematic side-view of an optical construction 700 that includes a voided diffuser 730 disposed on a substrate 710, and an optical adhesive layer 720 disposed on voided diffuser 730. Substrate 710 can be any of the substrates described elsewhere, including, for example, a substrate such as substrate 610 described with reference to FIG. 2. In some cases the optical adhesive layer 720 can act as a sealer to inhibit infiltration of voids of voided diffuser 730. In some cases, it may be desirable to have optical adhesive layer 720 and voided diffuser 730 on opposite sides of the substrate 710. In other cases, it may be desirable to have voided diffuser 730 on both sides of substrate 710.

Optical adhesive layer 720 can be any optical adhesive that may be desirable and/or available in an application. Optical adhesive layer 720 is of sufficient optical quality and light stability such that, for example, the adhesive layer does not yellow with time or upon exposure to weather so as to degrade the optical performance of the adhesive and the voided diffuser. In some cases, optical adhesive layer 720 can be a substantially clear optical adhesive meaning that the adhesive layer has a high specular transmittance and a low diffuse transmittance. For example, in such cases, the specular transmittance of optical adhesive layer 720 is not less than about 70%, or not less than about 80%, or not less than about 90%, or not less than about 95%.

In some cases, optical adhesive layer 720 is substantially optically diffusive, meaning that the adhesive layer has a high diffuse transmittance and a low specular transmittance, and the optical adhesive layer 720 can have a white appearance. For example, in such cases, the optical haze of an optically diffusive adhesive layer 720 is not less than about 30%, or not less than about 30%, or not less than about 50%, or not less than about 60%, or not less than about 70%, or not less than about 80%, or not less than about 90%, or not less than about 95%. In some case, the diffuse reflectance of the diffusive adhesive layer is not less than about 20%, or not less than about 30%, or not less than about 40%, or not less than about 50%, or not less than about 60%. In such cases, the adhesive layer can be optically diffusive by including a plurality of particles dispersed in an optical adhesive where the particles and the optical adhesive have different indices of refraction. The mismatch between the two indices of refraction can result in light scattering.

Exemplary optical adhesives include pressure sensitive adhesives (PSAs), heat-sensitive adhesives, solvent-volatile adhesives, repositionable adhesives or reworkable adhesives, and UV-curable adhesives such as UV-curable optical adhesives available from Norland Products, Inc.

Exemplary PSAs include those based on natural rubbers, synthetic rubbers, styrene block copolymers, (meth)acrylic block copolymers, polyvinyl ethers, polyolefins, and poly(meth)acrylates. As used herein, (meth)acrylic (or acrylate) refers to both acrylic and methacrylic species. Other exemplary PSAs include (meth)acrylates, rubbers, thermoplastic elastomers, silicones, urethanes, and combinations thereof. In some cases, the PSA is based on a (meth)acrylic PSA or at least one poly(meth)acrylate. Exemplary silicone PSAs include a polymer or gum and an optional tackifying resin. Other exemplary silicone PSAs include a polydiorganosiloxane polyoxamide and an optional tackifier.

Voided diffuser 730 can be similar to any voided diffuser disclosed herein. For example, voided diffuser 730 can be similar to one of voided diffusers 100, 100'.

Figure 4:
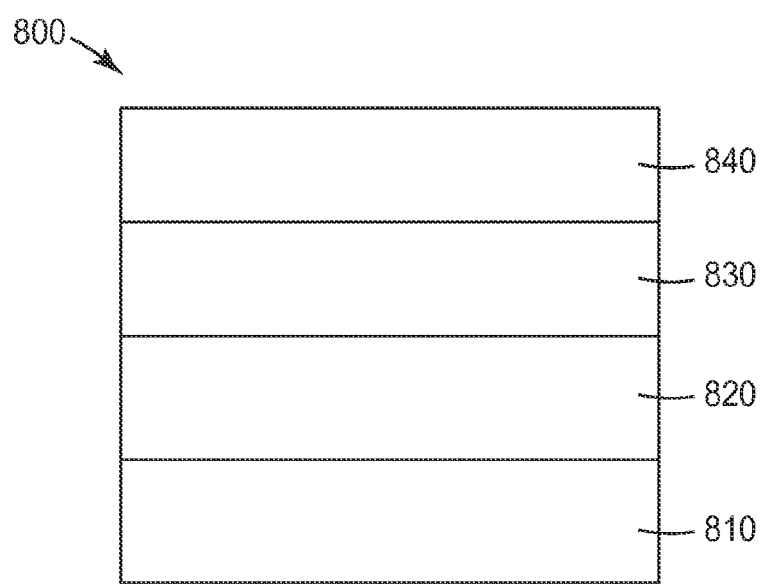
FIG. 4 is a schematic side-view of an optical construction.

FIG. 4 is a schematic side-view of an optical construction 800 that includes a low index coating 820 disposed on a substrate 810, a voided diffuser 830 disposed on low index coating 820, and an optional optical adhesive layer 840 disposed on voided diffuser 830. In some cases (not shown), optional optical adhesive layer 840 can instead (or additionally) be disposed on substrate 810, opposite low index coating 820. Substrate 810 can be any of the substrates described elsewhere, including, for example, a substrate such as substrate 610 described with reference to FIG. 2. Low index coating 820 can be any suitable low index coating such as described in, for example, co-pending U.S. Patent Application "Optical Film" (U.S. Application No. 61/169,466), filed on Apr. 15, 2009; and also co-pending U.S. Patent Applications entitled "Gradient Low Index Article and Method" (U.S. Application No. 61/254,673); and "Process for Gradient Nanovoided Article" (U.S. Application No. 61/254,674), both filed on an even date herewith. Optional optical adhesive layer 840 can be similar to optical adhesive layer 720. In some cases, low index coating 820 and optional optical adhesive layer 840 have the same index of refraction. In some cases, they can have different indices of refraction.

Voided diffuser 830 can be similar to any voided diffuser disclosed herein. For example, voided diffuser 830 can be similar to one of voided diffusers 100, 100'.

Some of the advantages of the disclosed films, layers, constructions, and systems are further illustrated by the following examples. The particular materials, amounts and dimensions recited in this example, as well as other conditions and details, should not be construed to unduly limit the present invention.

In the examples, the index of refraction was measured using a Metricon Model 2010 Prism Coupler (available from Metricon Corp., Pennington, N.J.). Optical transmittance and haze were measured using a Haze-Gard Plus haze meter (available from BYK-Gardner, Silver Springs, Md.).

EXAMPLES

The following list of materials and their source is referred to throughout the Examples.

| | |
|---|---|
| Nalco 2327—colloidal silica dispersion | Nalco Co. Naperville IL |
| 3-(trimethoxysilyl)propyl methacrylate (acrylate silane) | Aldrich Chemical, Milwaukee WI |
| Silquest ® A-174 silane | GE Advanced Materials, Wilton CT |
| Photomer 6891 aliphatic urethane diacrylate | Cognis, Cincinnati OH |
| Photomer 6010 aliphatic urethane acrylate | Cognis, Cincinnati OH |
| SR415 ethoxylated trimethylolpropane triacrylate | Sartomer Company, Exton PA |
| SR444 Pentaerythritol triacrylate | Sartomer Company, Exton PA |
| SR502 ethoxylated trimethylolpropane triacrylate | Sartomer Company, Exton PA |
| SR833S tricyclodecane dimethanol diacrylate | Sartomer Company, Exton PA |
| SR9003 propoxylated neopentyl glycol diacrylate | Sartomer Company, Exton PA |
| 9w162 $TiO_2$ dispersion | Penn Color, Doylestown, PA |
| Irgacure 819 - photoinitiator | Ciba Specialties Chemical, Tarrytown NY |
| Darocure 4265 - photoinitiator | Ciba Specialty Chemical, High Point NC |
| Esacure ® One—photoinitiator | Lamberti S.p.A., Gallarate, IT |
| 1-methoxy-2-propanol—solvent | Aldrich Chemical, Milwaukee WI |
| MEK—methyl ethyl ketone (solvent) | Aldrich Chemical, Milwaukee WI |
| IPA—isopropyl alcohol (solvent) | Aldrich Chemical, Milwaukee WI |
| DOWANOL ™ PM glycol ether—solvent | Dow Chemical, Midland MI |
| OCA 8171—optically clear adhesive | 3M Company, St. Paul, MN |
| Vikuiti ™ Dual Brightness Enhancing Film (DBEF, DBEF-Q, TOP-Q) | 3M Company, St. Paul, MN |
| SR5618 linear absorbing polarizer | San Ritz Corporation, Tokyo, Japan |
| SBX-6—6 micron polystyrene beads | Sekisui Plastics Co, Osaka, Japan |
| KSR3 polystyrene beads | Soken Chemical and Engineering Co., Tokyo |
| TS-35C—3 micron PMMA beads | Soken Chemical and Engineering Co., Tokyo |

Example 1

Voided Diffuser Having Decreased Clarity ("Gelled Voided Diffuser")

A coating formulation was prepared by mixing 33 g of Soken TS-35C PMMA beads, 90 g of IPA, 27 g of SR502, and 0.6 g Esacure One under rapid stirring. Coating formulations were coated by a syringe-pump at a various rates described below, into a 10.2 cm (4-inch) wide slot-type coating die. The slot coating die uniformly distributed a 10.2 cm wide coating onto a 2 mil PET substrate moving at 5 ft/min (152 cm/min).

Next, the coating was polymerized by passing the coated substrate through a UV-LED cure chamber that included a quartz window to allow passage of UV radiation. The UV-LED bank included a rectangular array of 352 UV-LEDs (16 down-web by 22 cross-web), covering an approximately 20.3 cm×20.3 cm area. The UV-LEDs were disposed on two water-cooled heat sinks. The LEDs (available from Cree, Inc., Durham N.C.) operated at a nominal wavelength of 395 nm, and were run at 45 Volts and 10 Amps, resulting in a UV-A dose of 0.108 joules per square cm. The UV-LED array was powered and fan-cooled by a TENMA 72-6910 (42V/10 A) power supply (available from Tenma, Springboro Ohio). The UV-LEDs were positioned above the cure chamber quartz window at a distance of approximately 2.54 cm from the substrate. The UV-LED cure chamber was supplied with a flow of nitrogen at a flow rate of 46.7 liters/min (100 cubic feet per hour) resulting in an oxygen concentration of approximately 150 ppm in the cure chamber.

After being polymerized by the UV-LEDs, the solvent in the cured coating was removed by transporting the coating to a drying oven operating at 150° F. (66 C) for 2 minutes at a web speed of 5 ft/min. Next, the dried coating was post-cured using a Fusion System Model I300P configured with an H-bulb (available from Fusion UV Systems, Gaithersburg Md.), operated at full power. The UV Fusion chamber was supplied with a flow of nitrogen that resulted in an oxygen concentration of approximately 50 ppm in the chamber. The percent Transmission (% T), percent Haze (% H), percent Clarity (% C) were measured from the PET side of the resulting diffuser, and the % T was also measured from the coated side of the resulting diffuser. Results of the measurements on each of the coatings are summarized in Table 1.

TABLE 1

| Sample # | Pump Rate (cc/min) | UV-LED Array (Amps) | Optics (PET side) | | | Optics (Coating side) |
|---|---|---|---|---|---|---|
| | | | % T | % H | % C | % T |
| 53a | 2.5 | 0 | 97.4 | 96.8 | 8.7 | 84.8 |
| 54a | 3.5 | 0 | 99.5 | 97.7 | 6.4 | 79.2 |
| 55a | 4.5 | 0 | 100 | 98.6 | 6.3 | 73.8 |
| 56a | 5.5 | 0 | 100 | 98.7 | 5.9 | 73.5 |
| 57a | 5.5 | 13 | 45.5 | 100 | 1.3 | 47.7 |
| 58a | 4.5 | 13 | 48 | 100 | 1.3 | 51.4 |
| 59a | 3.5 | 13 | 50.8 | 100 | 0.6 | 54.4 |
| 60a | 2.5 | 13 | 57.8 | 100 | 1.6 | 61.1 |
| 61a | 4.5 | 2 | 66.6 | 99.4 | 13.2 | 69.2 |
| 62a | 4.5 | 4 | 59.2 | 100 | 2.3 | 62.1 |
| 63a | 4.5 | 6 | 54.9 | 100 | 2.1 | 59.2 |
| 64a | 4.5 | 8 | 52.2 | 100 | 0 | 55.8 |
| 65a | 4.5 | 10 | 49.6 | 100 | 2 | 54.1 |

As shown in Table 1, the PMMA beads/SR502 mixture coated on a PET substrate with the UV-LED off (samples 53a-56a). In these samples, the solvent was removed before the coating is cured by the post-cure source. The resulting diffuser coatings showed high transmission, high haze, and low clarity. The significant difference on % T measured from PET side of the diffuser and from the coating side indicates a surface diffuser coating.

With UV-LED on (Samples 57a-65a), the solvent was removed after the UV-LED cure, and the appearance of the coatings changed from translucent to white. The % T measured from both the PET side of the diffuser and from coating side of the diffuser are very close to each other, indicating a volume diffuser (that is, a voided diffuser) coating.

Example 2

Voided Diffuser Having Decreased Clarity ("Gelled Voided Diffuser")

A coating formulation was prepared by mixing 30 g of Soken TS-35C PMMA beads, 86 g of IPA, 27.4 g of SR415, and 0.7 g Esacure One under rapid stirring. Coating formulations were coated by a syringe-pump at a various rates described below, into a 10.2 cm (4-inch) wide slot-type coating die. The slot coating die uniformly distributed a 10.2 cm wide coating onto a 2 mil PET substrate moving at 5 ft/min (152 cm/min). The polymerization, drying, and post-cure was the same as provided in Example 1.

The percent Transmission (% T), percent Haze (% H), percent Clarity (% C) were measured from the PET side of the resulting voided diffuser. Results of the measurements on each of the coatings are summarized in Table 2.

TABLE 2

| Sample # | Pump Rate (cc/min) | UV-LED Array (Amps) | Optics (PET side) | | |
|---|---|---|---|---|---|
| | | | % T | % H | % C |
| 101b | 3.5 | 0 | 97.6 | 97.8 | 5.5 |
| 102b | 4.5 | 0 | 94.4 | 100 | 4.6 |
| 106b | 3.5 | 13 | 54.8 | 100 | 0.1 |
| 108b | 4.5 | 2 | 73.8 | 100.0 | 11.8 |
| 109b | 4.5 | 4 | 64.3 | 100 | 3.6 |
| 110b | 4.5 | 6 | 56 | 100 | 1.5 |
| 111b | 4.5 | 8 | 52.8 | 100 | 2.3 |
| 112b | 4.5 | 10 | 52 | 100 | 1.7 |

Figure 5A:
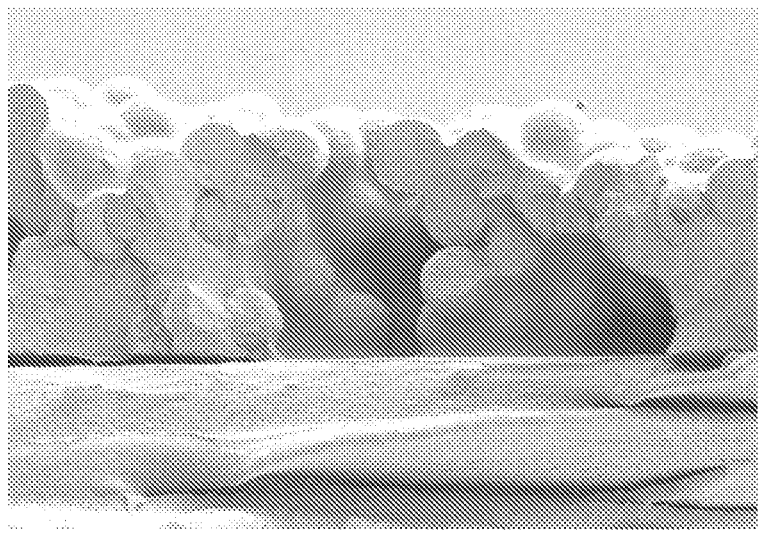
FIG. 5A is an SEM of a diffuser.
Figure 5B:
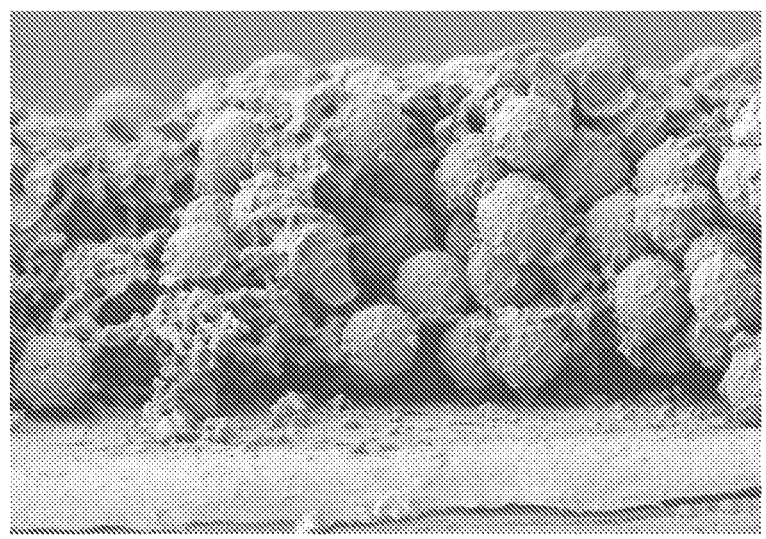
FIG. 5B is an SEM of a voided diffuser.

FIG. 5A shows an SEM cross-sections of a diffuser (cured after solvent removal) according to Sample 102a shown in Table 2. FIG. 5B shows an SEM cross-section of a voided diffuser according to sample 106b in Table 2. More porous structures are observed with UV-LED polymerization before solvent removal.

The durability of selected diffuser samples from Example 1 were measured cross-web to the coating direction by use of a mechanical device capable of oscillating a felt pad adhered to a stylus, across the film's surface. The stylus oscillated over a 60 mm wide sweep width at a rate of 210 mm/sec wherein a "wipe" is defined as a single travel of 60 mm. The stylus had a flat, cylindrical base geometry with a diameter of 3.2 cm. The stylus was designed for attachment of weights to increase the force exerted by the felt pad normal to the film's surface. The 3.2 cm felt pads were obtained from National Mfg. Co (Part No. N237-115). The oscillation was repeated 25 times for each measurement. A durability rating was assigned as follows: 0 (corresponds to up to 5% removal of the coating), 1 (corresponds to 5-20% removal of the coating), 2 (corresponds to 20-50% removal of the coating) and 3 (greater than 50% removal of the coating). The data are summarized in Table 3.

TABLE 3

| Sample # | Weight 194 g | Weight 740 g | Weight 2763 g |
|---|---|---|---|
| 54a | 0 | 0 | 0 |
| 60a | 0 | 1 | 3 |
| 62a | 0 | 0 | 0 |
| 59a | 0 | 1 | 3 |
| 55a | 0 | 0 | 1 |
| 64a | 0 | 0 | 1 |
| 65a | 0 | 0 | 1 |
| 63a | 0 | 0 | 1 |

Example 3

Voided Diffuser Having Decreased Clarity ("Gelled Voided Diffuser")

Several optical constructions were fabricated using four different diffuser samples (102b, 106b, 109b, 111b) from Example 2. Optical properties were measured on these constructions and compared to an optical construction including a standard volume diffuser.

A first set of optical constructions (designated AP-102b, AP-106b, AP-109b, and AP-111b in Table 4, below) were prepared by placing the substrate of the respective diffuser sample in contact with an SR5618 linear absorbing polarizer (that is, the diffuser coating faced away from the polarizer). No adhesive was used between the substrate and the polarizer, so the optical constructions were not considered to be in optical contact.

A second set of optical constructions (designated AP*Q*102b, AP*Q*106b, AP*Q*109b, AP*Q*111b in Table 4, below) were prepared as follows. One side of a DBEF-Q reflective polarizer was laminated to the SR5618 linear absorbing polarizer with OCA 8171 optically clear adhesive. The other side of the DBEF-Q reflective polarizer was laminated to the respective diffuser sample, again using OCA 8171 optically clear adhesive (that is, the diffuser coating faced away from both the linear and reflective polarizers). The resulting optical constructions were considered to be in optical contact.

A reference optical construction (AP-AR33) was made for comparison, and to normalize the data presented in Table 4. A mixture was made that included SBX-6 polystyrene beads (26% by weight), Photomer 6010 (9% by weight), SR9003 (4.6% by weight) and SR833 (4% by weight), Dowanol PM (60% by weight), and Darocure 4265 (0.4% by weight). The mixture was stirred in a high shear mixer with the beads added last to the mixture. Next, a 9w162 $TiO_2$ dispersion (2.6% by weight) was added to the above mixture. The resulting solution was then coated, dried and uv-cured to a dry thickness of about 39 microns on 0.254 mm thick polyester (PET) film. The resulting reference volume optical diffuser (AR33) had a total optical transmission of about 50%, an optical haze of about 100%, and a clarity of about 3%. The reference optical construction (AP-AR33) was made by by placing the substrate of the reference volume diffuser in contact with an SR5618 linear absorbing polarizer (that is, the diffuser coating faced away from the polarizer). No adhesive was used between the substrate and the polarizer, so the reference optical construction was not considered to be in optical contact.

The axial luminance ($cd/m^2$), integrated intensity ($lm/m^2$), and half brightness angles (degrees) in the up and down directions of the optical construction were measured using a Schott-Fostec-DCR light source (available from Schott-Fostec LLC, Auburn N.Y.) for illuminating the reference optical construction from the diffuser side, and an Autronic Conoscope Conostage 3 (available from Autronic-Melchers GmbH, Karlsruhe, Germany) for collecting data from the linear polarizer side. For comparison purposes, the measured axial luminance and integrated intensity values were normalized to the reference volume diffuser (AP-AR33) set at 100%, and the optical properties are summarized in Table 4.

Example 4

Voided Diffuser Having Low Gain, Decreased Clarity ("Gelled Diffuser")

A coating solution was prepared by mixing together 480 g Photomer 6891, 246 g SR9003, 214 g SR833, 1741 g KSR3 polystyrene beads, 1600 g Dowanol PM, 1600 g methanol, and 21.2 g Darocure 4265. Coating formulations were coated by a syringe-pump at a various rates described below, into an 8 inch (20.3 cm) wide slot type coating die. The coating was delivered to a Vikuiti™ Dual Brightness Enhancing Film (DBEF) web moving at a speed that was moving at 30 ft/min (9.14 m/min) After coating, the web entered a 5 ft (152 cm) long section of a Gap dryer operating with a 0.25 inch (0.64 cm) gap and both upper and lower plates set at 70° F. (21 C).

The coated web then passed into the polymerization section which used a 395 nm UV LED water-cooled array consisting of 16 rows of LEDs with 22 LEDs in each row. The 22 LEDs in each row were equally spaced across the web width, and the 16 rows were equally spaced along the downweb direction in an area of approximately 8"×8" (20.3×20.3 cm). The 352 LEDs in the array were 395 nm UV LEDs (available from Cree Inc., Durham N.C.). The LED array was powered using a LAMBDA GENH750W power supply. The power supply output was varied from 0 to 13 amps as indicated below, and operated at approximately 45 volts. The controlled environment was supplied with approximately 200 cubic feet/hour (94.4 liters/min) of nitrogen resulting in approximately 220 ppm oxygen concentration in the controlled environment of the polymerization section. After exiting the apparatus, the web travelled approximately 3 ft (0.9 m) before entering a 30 ft (9.1 m) conventional air floatation drier with all 3 zones set at 150° F. (66 C). After drying and before winding, the polymerized and dried coating was post-polymerized using a Fusion UV Systems, Inc. VPS/I600 (Gaithersburg, Md.). The Fusion system was configured with an H-bulb and was operated 100% power at less than 50 ppm oxygen in the cure zone.

The percent Transmission (% T), percent Haze (% H), percent Clarity (% C) were measured from the PET side of the resulting diffuser, and the % T was also measured from the coated side of the resulting diffuser. The gain for each optical construction was determined by measuring the transmittance $T_a$ before coating the reflective polarizer, and measuring the transmission $T_b$ of the optical construction after coating the reflective polarizer layer. The optical gain for each sample was the ration $T_b/T_a$. Results of the measurements on each of the coatings are summarized in Table 4.

TABLE 4

| Sample # | Axial Luminance (% of ref) | Maximum Luminance (% of ref) | Integrated Intensity (% of ref) | Half Brightness Angles (Degrees) | | | |
|---|---|---|---|---|---|---|---|
| | | | | Left | Right | Up | Down |
| AP-APR33 (ref) | 100% | 100% | 100% | 64 | 66 | 0 | 0 |
| AP-102b | 109% | 109% | 110% | 66 | 66 | 0 | 0 |
| AP-106b | 107% | 106% | 102% | 62 | 64 | 0 | 0 |
| AP-109b | 110% | 110% | 106% | 62 | 64 | 0 | 0 |
| AP-111b | 107% | 107% | 102% | 62 | 62 | 0 | 0 |
| AP*Q*102b | 136% | 135% | 137% | 74 | 76 | 0 | 0 |
| AP*Q*106b | 149% | 149% | 146% | 70 | 72 | 0 | 0 |
| AP*Q*109b | 155% | 155% | 149% | 70 | 70 | 0 | 0 |
| AP*Q*110b | 150% | 149% | 143% | 68 | 70 | 80 | 0 |
| AP*Q*111b | 150% | 149% | 143% | 68 | 70 | 0 | 0 |

TABLE 4

| Sample # | Pump Rate (grams/min) | UV-LED Power (Amps) | Thickness (microns) | Gain | % T | % H | % C |
|---|---|---|---|---|---|---|---|
| 105c | 129 | 0 | 34.3 | 1.15 | 45 | 101 | 0 |
| 106c | 129 | 2 | 35.4 | 1.08 | 30 | 101 | 0 |
| 107c | 129 | 7 | 45.8 | 1.07 | 24 | 101 | 0 |
| 108c | 129 | 13 | 45.4 | 1.08 | 24 | 101 | 0 |
| 109c | 109 | 0 | 29.0 | 1.15 | 46 | 102 | 0 |
| 110c | 109 | 2 | 34.3 | 1.09 | 31 | 101 | 0 |
| 111c | 109 | 7 | 38.4 | 1.09 | 25 | 101 | 0 |
| 112c | 109 | 13 | 38.0 | 1.11 | 26 | 101 | 0 |
| 113c | 89 | 0 | 25.4 | 1.19 | 47 | 101 | 0 |
| 114c | 89 | 2 | 28.7 | 1.16 | 32 | 101 | 0 |
| 115c | 89 | 7 | 30.8 | 1.19 | 28 | 101 | 0 |
| 116c | 89 | 13 | 32.0 | 1.16 | 28 | 101 | 0 |

Example 5

Voided Diffuser Overcoated on Gradient Low Index Coating

Preparation of Gradient Low Index Coating on DBEF Substrate.

A gradient low index coating was prepared according to the procedure described in co-pending U.S. patent application entitled "Gradient low index article and method" (U.S. Application No. 61/254,673), filed on an even date herewith. The procedure is presented below.

A photoinitiator was coated on a substrate to generate the change in density from the substrate interface to an air interface. The photoinitiator coating solution was prepared by mixing 0.3% by weight of Irgacure 819 in MEK. This photoinitiator solution was coated onto a DBEF film using a 43.2 cm (17 inch) wide slot-type coating die. The solution was coated at a rate of 127 g/min and a line speed of 30.5 m/min (100 feet/min). The coating was then dried in an oven at 150° F. This resulted in a photoinitiator primed substrate.

A coating solution "A" was made. First, 360 g of Nalco 2327 colloidal silica particles (40% wt solid and an average particle diameter of about 20 nanometers) and 300 g of 1-methoxy-2-propanol were mixed together under rapid stirring in a 2-liter three-neck flask that was equipped with a condenser and a thermometer. Next, 22.15 g of Silquest A-174 silane was added, and the mixture was stirred for 10 minutes. An additional 400 g of 1-methoxy-2-propanol was then added, and the mixture was heated at 85 C for 6 hours using a heating mantle. The resulting solution was allowed to cool down to room temperature, and most of water and 1-methoxy-2-propanol solvents (about 700 g) were removed using a rotary evaporator under a 60 C water-bath. The resulting solution was a clear A-174 modified silica solution having 44% wt A-174 modified 20 nm silica, dispersed in 1-methoxy-2-propanol.

The coating solution "A" was composed of 18.0 wt % of the clear A-174 modified silica solution (having 44% wt A-174 modified 20 nm silica dispersed in 1-methoxy-2-propanol), 23.9 wt % 1-methoxy-2-propanol, 46.1 wt % IPA, 12.0 wt % SR444. Irgacure 819 was added to coating solution "A" at a rate 0.15 parts per hundred (pph). Coating solution A was pumped (using a pressure pot) at a rate of 15.2 g/min into a 43.2 cm (17 inch) wide slot-type coating die. The slot coating die uniformly distributed a 43.2 cm wide coating onto the photoinitiator primed substrate at a speed of 1.52 m/min (10 ft/min).

Next, the coating was polymerized by passing the coated substrate through a UV-LED cure chamber that included a quartz window to allow passage of UV radiation. The UV-LED cure chamber included a rectangular array of 160 UV-LEDs, 4 down-web by 40 cross-web (approximately covering a 42.5 cm×4.5 cm area). The LEDs (available from Nichia Inc., Tokyo Japan) operated at a nominal wavelength of 385 nm and were run at 8 Amps, resulting in a UV-A dose of 0.052 joules per square cm. The fan-cooled UV-LED array was powered by a Lambda GENH 60-12.5-U power supply (available from TDK-Lambda, Neptune N.J.). The UV-LEDs were positioned above the quartz window of the cure chamber at a distance of approximately 2.5 cm from the substrate. The UV-LED cure chamber was supplied with a flow of nitrogen at a flow rate of 141.6 liters/min (5 cubic feet per minute). Air was introduced into the nitrogen supply to control the total oxygen level in the UV-LED chamber. The oxygen level in the UV-LED cure chamber was varied by changing the airflow rate, and the oxygen level was monitored using a Series 3000 oxygen analyzer (available from Alpha Omega Instruments, Cumberland R.I.).

After being polymerized by the UV-LEDs, the solvent in the cured coating was removed by transporting the coated substrate to a drying oven at 150° F. (66 C) for 2 minutes at a web speed of 10 ft/min. Next, the dried coating was post-cured using a Fusion System Model I600 configured with a D-bulb (available from Fusion UV Systems, Gaithersburg Md.). The UV Fusion chamber was supplied with a flow of nitrogen that resulted in an oxygen concentration of approximately 50 ppm in the chamber. This resulted in the gradient low index coating on DBEF.

Overcoating of Voided Diffuser on Gradient Low Index Coated DBEF

A voided diffuser coating solution was prepared by mixing together 487.5 g Photomer 6210, 249.4 g SR9003, 217.5 g SR833, 1774.3 g KSR3 polystyrene beads, 1630 g 1-methoxy-2-propanol, 1627.8 g methanol, and 21.4 g Darocure 4265. Coating formulations were coated by a pressure pot at a flow rate of 113.5 g/min, into an 8 inch (20.3 cm) wide slot type coating die. The coating was delivered to the gradient low index coating on DBEF described above, moving at a speed of 30 ft/min (9.14 m/min) After coating, the web entered a 5 ft (152 cm) long section of a Gap dryer operating with a 0.25 inch (0.64 cm) gap and both upper and lower plates set at 70° F. (21 C).

The coated web then passed into the polymerization section which used a 395 nm UV LED water-cooled array consisting of 16 rows of LEDs with 22 LEDs in each row. The 22 LEDs in each row were equally spaced across the web width, and the 16 rows were equally spaced along the downweb direction in an area of approximately 8"×8" (20.3×20.3 cm). The 352 LEDs in the array were 395 nm UV LEDs (available from Cree Inc., Durham N.C.). The LED array was powered using a LAMBDA GENH750W power supply. The power supply output was operated at 4 amps as indicated below, and operated at approximately 45 volts. The controlled environment was supplied with approximately 300 cubic feet/hour (141.6 liters/min) of nitrogen resulting in approximately 59 ppm oxygen concentration in the controlled environment of the polymerization section. After exiting the apparatus, the web travelled approximately 3 ft (0.9 m) before entering a 30 ft (9.1 m) conventional air floatation drier with all 3 zones set at 150° F. (66 C). After drying and before winding, the polymerized and dried coating was post-polymerized using a Fusion UV Systems, Inc. VPS/1600 (Gaithersburg, Md.). The Fusion system was configured with an H-bulb and was operated 40% power at less than 50 ppm oxygen in the cure zone.

The percent Transmission (% T), percent Haze (% H), percent Clarity (% C), and Gain were measured from the DBEF side of the resulting diffuser, as described in Example 4. The % T was 37%, the % H was 101%, the % C was 0%, and the Gain was 149%.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A voided diffuser, comprising:
    a plurality of beads;
    a binder composition in contact with the plurality of beads, the binder composition comprising a binder and a plurality of interconnected voids, wherein a volume fraction of the plurality of interconnected voids in the binder composition is not less than about 5%.

2. The voided diffuser of claim 1, wherein the plurality of beads has an average size that is not less than about 1 micron.

3. The voided diffuser of claim 1, wherein a weight ratio of the plurality of beads to that of the binder composition is not less than about 1:1.

4. The voided diffuser of claim 1, wherein the plurality of interconnected voids has an average void size that is not greater than about 2 microns.

5. The voided diffuser of claim 1, wherein the volume fraction of the plurality of interconnected voids in the binder composition is not less than about 10%.

6. The voided diffuser of claim 1 having an optical haze that is not less than about 90%.

7. The voided diffuser of claim 1 having an optical clarity that is not greater than about 10%.

8. The voided diffuser of claim 1, having an optical clarity that is less than about 10% and a thickness that is not less than about 5 microns.

9. The voided diffuser of claim 1, having an optical clarity that is less than about 5% and a thickness that is not less than about 5 microns.

10. The voided diffuser of claim 1, wherein the binder composition further comprises a plurality of particles.

11. The voided diffuser of claim 10, wherein the plurality of particles has an average size that is not greater than about 1 micron.

12. The voided diffuser of claim 10, wherein a weight ratio of the binder to the plurality of particles is not less than about 1:1.

13. An optical construction comprising:
    a substrate; and
    a voided diffuser disposed on the substrate, the voided diffuser including:
        a binder;
        a plurality of interconnected voids dispersed within the binder; and
        a plurality of beads, wherein a weight ratio of the binder to the plurality of the beads is not less than about 1:1.

14. The optical construction of claim 13, wherein the plurality of interconnected voids has an average void size that is not greater than about 1 micron.

15. The optical construction of claim 13, wherein a volume fraction of the plurality of interconnected voids in the voided diffuser is not less than about 5%.

16. The optical construction of claim 13, wherein the plurality of beads has an average size that is not greater than about 10 microns.

17. The optical construction of claim 13, having a gain of no less than about 1.2.

18. An optical construction comprising:
    a reflective polarizer; and
    a voided diffuser disposed on the reflective polarizer and having a plurality of voids and a plurality of beads, and an optical clarity that is not greater than about 10%, wherein a thickness of the voided diffuser is not less than about 5 microns.

19. The optical construction of claim 18 having a gain of no less than about 1.2.

20. An optical stack comprising:
    an absorbing polarizer;
    a voided diffuser comprising a plurality of voids and a plurality of beads; and
    a reflective polarizer, wherein substantial portions of each two neighboring major surfaces in the optical stack are in physical contact with each other.

21. The optical stack of claim 20, wherein the voided diffuser is disposed between the absorbing polarizer and the reflective polarizer.

* * * * *

UNITED STATES PATENT AND TRADEMARK OFFICE
CERTIFICATE OF CORRECTION

PATENT NO. : 8,982,468 B2  
APPLICATION NO. : 13/501310  
DATED : March 17, 2015  
INVENTOR(S) : Petaja et al.

It is certified that error appears in the above-identified patent and that said Letters Patent is hereby corrected as shown below:

In the specification

Column 1, Line 15: Delete "Publications Nos." and insert -- Applications, filed on Apr. 15, 2009 and --, therefor.
Column 1, Line 27: Delete "Publications Nos.," and insert -- Applications, filed on an even date herewith and --, therefor.
Column 1, Line 29: After "61/254,673);" insert -- and --.
Column 1, Line 30-32: Delete "2012-0195050, entitled "Optical Constructions and Method of Making the Same"." and insert -- U.S. Patent Application No. 61/254,243 entitled "Optical Constructions and Method of Making the Same", filed on Oct. 23, 2009. --, therefor.
Column 3, Line 8: Delete "displays" and insert -- displays. --, therefor.
Column 9, Line 56: Delete "61/169,521)," and insert -- 61/169,429), --, therefor.
Column 11, Line 7: Delete "61/254,674), 65766US002)," and insert -- 61/254,674), --, therefor.
Column 12, Line 61: Delete "microreplictated" and insert -- microreplicated --, therefor.
Column 16, Line 4: Delete "Silquest ®" and insert -- Silquest® --, therefor.
Column 16, Line 19: Delete "Esacure ®" and insert -- Esacure® --, therefor.
Column 16, Line 25: Delete "DOWANOL ™" and insert -- DOWANOL™ --, therefor.
Column 19, Line 32: Delete "by by" and insert -- by --, therefor.
Column 20, Line 15: Delete "m/min)" and insert -- m/min). --, therefor.
Column 22, Line 42: Delete "m/min)" and insert -- m/min). --, therefor.

Signed and Sealed this  
Twenty-sixth Day of January, 2016

Michelle K. Lee  
*Director of the United States Patent and Trademark Office*